US010421260B2

(12) United States Patent
Richardson et al.

(10) Patent No.: US 10,421,260 B2
(45) Date of Patent: *Sep. 24, 2019

(54) CARRIER WITH LOCALIZED FIBROUS INSERT AND METHODS

(71) Applicant: Zephyros, Inc., Romeo, MI (US)

(72) Inventors: Henry E. Richardson, Washington, MI (US); Frank Braymand, Molsheim (FR); Eric Chopin, Molsheim (FR)

(73) Assignee: Zephyros, Inc., Romeo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/573,604

(22) Filed: Dec. 17, 2014

(65) Prior Publication Data

US 2015/0165737 A1     Jun. 18, 2015

Related U.S. Application Data

(63) Continuation of application No. PCT/US2014/061531, filed on Oct. 21, 2014.
(Continued)

(51) Int. Cl.
*B32B 27/38* (2006.01)
*B32B 5/02* (2006.01)
(Continued)

(52) U.S. Cl.
CPC ............ *B32B 27/38* (2013.01); *B29C 70/68* (2013.01); *B32B 5/024* (2013.01); *B32B 7/12* (2013.01);
(Continued)

(58) Field of Classification Search
CPC .............. B32B 27/38; B32B 3/18; B32B 5/02
See application file for complete search history.

(56) References Cited

U.S. PATENT DOCUMENTS 2,997,122 A   8/1961   Frey et al.
3,124,626 A   3/1964   Graham et al.
(Continued)

FOREIGN PATENT DOCUMENTS

CN   1812909 A   6/2006
EP   0623758 A   11/1994
(Continued)

OTHER PUBLICATIONS

PCT Search Report & Written Opinion dated Mar. 16, 2015; Application No. PCT/US2014/070853.
(Continued)

*Primary Examiner* — Victor S Chang
(74) *Attorney, Agent, or Firm* — The Dobrusin Law Firm, PC (57) ABSTRACT

A structural reinforcement for an article including a carrier that includes: (i) a mass of polymeric material having an outer surface; and (ii) at least one consolidated fibrous insert (14) having an outer surface and including at least one elongated fiber arrangement having a plurality of ordered fibers arranged in a predetermined manner. The fibrous insert is envisioned to adjoin the mass of the polymeric material in a predetermined location for carrying a predetermined load that is subjected upon the predetermined location (thereby effectively providing localized reinforcement to that predetermined location). The fibrous insert and the mass of polymeric material are of compatible materials, structures or both, for allowing the fibrous insert to be at least partially joined to the mass of the polymeric material. Disposed upon at least a portion of the carrier may be a mass of activatable material.

17 Claims, 4 Drawing Sheets

Related U.S. Application Data (60) Provisional application No. 61/916,884, filed on Dec. 17, 2013.

(51) Int. Cl.
  *B32B 27/12* (2006.01)
  *B62D 29/00* (2006.01)
  *B32B 7/12* (2006.01)
  *B32B 27/34* (2006.01)
  *B29C 70/68* (2006.01)
  *B32B 3/18* (2006.01)
  *B29K 63/00* (2006.01)
  *B29K 105/08* (2006.01)

(52) U.S. Cl.
  CPC .............. *B32B 27/12* (2013.01); *B32B 27/34* (2013.01); *B62D 29/002* (2013.01); *B29K 2063/00* (2013.01); *B29K 2105/08* (2013.01); *B32B 3/18* (2013.01); *B32B 5/02* (2013.01); *B32B 2262/02* (2013.01); *B32B 2262/10* (2013.01); *B32B 2262/101* (2013.01); *B32B 2262/106* (2013.01); *B32B 2307/50* (2013.01); *B32B 2605/00* (2013.01); *B32B 2605/08* (2013.01); *B32B 2605/18* (2013.01); *Y10T 428/192* (2015.01); *Y10T 428/24612* (2015.01)

(56) References Cited

U.S. PATENT DOCUMENTS

| | | | |
|---|---|---|---|
| 3,451,696 A | 6/1969 | Gustav et al. | |
| 3,586,556 A | 6/1971 | Clark et al. | |
| 4,319,768 A | 3/1982 | Youngdale | |
| 4,332,397 A | 6/1982 | Steger | |
| 4,810,548 A | 3/1989 | Ligon et al. | |
| 4,922,596 A | 5/1990 | Wycech | |
| 4,978,562 A | 12/1990 | Wycech | |
| 4,981,287 A | 1/1991 | Cothenet | |
| 5,124,186 A | 6/1992 | Wycech | |
| 5,164,135 A | 11/1992 | Parker | |
| 5,266,133 A | 11/1993 | Hanley | |
| 5,344,208 A | 9/1994 | Bien et al. | |
| 5,358,397 A | 10/1994 | Ligon et al. | |
| 5,431,363 A | 7/1995 | Ezzat et al. | |
| 5,487,803 A | 1/1996 | Sweeney et al. | |
| 5,506,025 A | 4/1996 | Otto et al. | |
| 5,552,095 A | 9/1996 | Merser et al. | |
| 5,571,355 A | 11/1996 | Kornylo | |
| 5,575,526 A | 11/1996 | Wycech | |
| 5,690,035 A | 11/1997 | Hatayama et al. | |
| 5,743,979 A | 4/1998 | Lorbiecki | |
| 5,752,342 A | 5/1998 | Kreye | |
| 5,755,486 A | 5/1998 | Wycech | |
| 5,766,719 A | 6/1998 | Rimkus | |
| 5,884,960 A | 3/1999 | Wycech | |
| 5,904,024 A | 5/1999 | Miwa | |
| 5,932,680 A | 8/1999 | Heider | |
| 5,933,680 A | 8/1999 | Nishimura | |
| 5,997,786 A | 12/1999 | Arthur et al. | |
| 6,030,701 A | 2/2000 | Johnson et al. | |
| 6,074,506 A | 6/2000 | Herring, Jr. et al. | |
| 6,103,341 A | 8/2000 | Barz et al. | |
| 6,131,897 A | 10/2000 | Barz et al. | |
| 6,199,940 B1 | 3/2001 | Hopton et al. | |
| 6,247,287 B1 | 6/2001 | Takabatake | |
| 6,270,600 B1 | 8/2001 | Wycech | |
| 6,293,572 B1 | 9/2001 | Robbins et al. | |
| 6,368,438 B1 | 4/2002 | Chang et al. | |
| 6,379,762 B1 | 4/2002 | Omichinski | |
| 6,382,635 B1 | 5/2002 | Fitzgerald | |
| 6,422,575 B1 | 7/2002 | Czaplicki | |
| 6,467,834 B1 | 10/2002 | Barz | |
| 6,468,371 B1 | 10/2002 | Poulakis | |
| 6,468,613 B1 | 10/2002 | Kitano et al. | |
| 6,471,285 B1 | 10/2002 | Czaplicki et al. | |
| 6,482,486 B1 | 11/2002 | Czaplicki | |
| 6,511,120 B1 | 1/2003 | Mitts | |
| 6,530,577 B1 | 3/2003 | Busby et al. | |
| 6,543,976 B1 | 4/2003 | Malofsky | |
| 6,585,202 B2 | 7/2003 | Broccardo | |
| 6,668,457 B1 | 12/2003 | Czaplicki | |
| 6,708,368 B2 | 3/2004 | Nhep et al. | |
| 6,711,800 B2 | 3/2004 | Savoy | |
| 6,719,293 B1 | 4/2004 | Coles et al. | |
| 6,786,533 B2 | 9/2004 | Bock et al. | |
| 6,793,274 B2 | 9/2004 | Riley et al. | |
| 6,808,774 B2 | 10/2004 | Autterson et al. | |
| 6,855,652 B2 | 2/2005 | Hable et al. | |
| 6,890,021 B2 | 5/2005 | Bock et al. | |
| 6,923,499 B2 | 8/2005 | Wieber et al. | |
| 6,941,719 B2 | 9/2005 | Busseuil et al. | |
| 6,953,219 B2 | 10/2005 | Lutz et al. | |
| 6,969,551 B2 | 11/2005 | Richardson et al. | |
| 6,991,237 B2 | 1/2006 | Kassa et al. | |
| 7,004,536 B2 | 2/2006 | Wieber | |
| 7,022,400 B2 | 4/2006 | Bolling | |
| 7,077,461 B2 | 7/2006 | Ratet | |
| 7,111,882 B2 | 9/2006 | Corscadden et al. | |
| 7,125,461 B2 | 10/2006 | Czaplicki et al. | |
| 7,199,165 B2 | 4/2007 | Kassa et al. | |
| 7,249,215 B2 | 7/2007 | Surico et al. | |
| 7,255,388 B2 | 8/2007 | Le Gall et al. | |
| 7,290,828 B2 | 11/2007 | Kosal et al. | |
| 7,318,873 B2 | 1/2008 | Czaplicki et al. | |
| 7,422,088 B2 | 9/2008 | Ito | |
| 7,428,774 B2 | 9/2008 | Thomas et al. | |
| 7,469,459 B2 | 12/2008 | Kosal et al. | |
| 7,484,946 B2 | 2/2009 | Nitsche et al. | |
| 7,494,179 B2 | 2/2009 | Deachin et al. | |
| 7,503,620 B2 | 3/2009 | Brennecke et al. | |
| 7,521,093 B2 | 4/2009 | Finerman et al. | |
| 7,581,932 B2 | 9/2009 | Coupe et al. | |
| 7,677,639 B2 | 3/2010 | Cafeo et al. | |
| 7,731,261 B2 | 6/2010 | Wenzel et al. | |
| 7,787,186 B2 | 8/2010 | White et al. | |
| 7,941,925 B2 | 5/2011 | Larsen et al. | |
| 7,984,919 B2 | 7/2011 | Nitsche et al. | |
| 8,002,332 B2 | 8/2011 | Coon et al. | |
| 8,070,994 B2 | 12/2011 | Carlson et al. | |
| 8,163,116 B2 | 4/2012 | Riley | |
| 8,181,327 B2 | 5/2012 | Apfel | |
| 8,334,055 B2 | 12/2012 | Le Gall et al. | |
| 8,430,448 B2 | 4/2013 | Richardson et al. | |
| 8,685,514 B2 | 4/2014 | Jeruzal et al. | |
| 2002/0024233 A1 | 2/2002 | Kleino | |
| 2003/0039792 A1 | 2/2003 | Hable et al. | |
| 2003/0183317 A1* | 10/2003 | Czaplicki | B29C 70/70 156/79 |
| 2004/0018341 A1 | 1/2004 | Richardson et al. | |
| 2004/0076831 A1 | 4/2004 | Hable et al. | |
| 2004/0221953 A1 | 11/2004 | Czaplicki | |
| 2004/0266898 A1 | 12/2004 | Kassa | |
| 2005/0121942 A1 | 6/2005 | Repp et al. | |
| 2005/0166532 A1 | 8/2005 | Barz | |
| 2005/0244215 A1 | 11/2005 | Prat et al. | |
| 2005/0260399 A1 | 11/2005 | Finerman | |
| 2005/0268454 A1 | 12/2005 | White | |
| 2006/0000186 A1 | 1/2006 | Carlson et al. | |
| 2006/0003044 A1 | 1/2006 | DiNello et al. | |
| 2006/0260204 A1 | 11/2006 | Repp et al. | |
| 2007/0045866 A1 | 3/2007 | Gray et al. | |
| 2007/0090560 A1 | 4/2007 | Kassa et al. | |
| 2007/0101679 A1 | 5/2007 | Harthcock | |
| 2007/0257515 A1 | 11/2007 | Larsen et al. | |
| 2007/0281523 A1 | 12/2007 | Riley | |
| 2008/0012263 A1 | 1/2008 | Dickson et al. | |
| 2008/0061602 A1 | 3/2008 | Czaplicki et al. | |
| 2008/0179913 A1 | 7/2008 | Coon et al. | |
| 2008/0226866 A1 | 9/2008 | Vilcek et al. | |
| 2008/0254214 A1 | 10/2008 | Kassa et al. | |
| 2008/0265457 A1 | 10/2008 | McLeod et al. | |

(56) References Cited

U.S. PATENT DOCUMENTS

| | | |
|---|---|---|
| 2009/0202294 A1 | 8/2009 | Apfel |
| 2009/0211161 A1 | 8/2009 | Dries |
| 2010/0289242 A1 | 11/2010 | Nitsche et al. |
| 2011/0039470 A1 | 2/2011 | Wakeman et al. |
| 2011/0206890 A1* | 8/2011 | Belpaire ............. B62D 29/002 428/68 |
| 2011/0278802 A1 | 11/2011 | Nitsche et al. |
| 2012/0251863 A1 | 10/2012 | Berger et al. |
| 2013/0206333 A1* | 8/2013 | Czaplicki ............. C09J 5/06 156/275.5 |

FOREIGN PATENT DOCUMENTS

| | | |
|---|---|---|
| EP | 0893332 A1 | 1/1999 |
| EP | 1122152 A2 | 8/2001 |
| EP | 1586595 A1 | 10/2005 |
| FR | 2812268 A1 | 2/2002 |
| FR | 2881458 A1 | 8/2006 |
| GB | 1541482 A | 3/1979 |
| GB | 2224683 A | 5/1990 |
| JP | 3-33385 | 2/1991 |
| JP | 5-280107 | 10/1993 |
| JP | 10-81138 | 3/1998 |
| JP | 2004/036660 A | 2/2004 |
| SU | 1803616 A1 | 3/1993 |
| WO | 2000/027920 A1 | 5/2000 |
| WO | 2007/050536 A1 | 5/2001 |
| WO | 2005/077634 A2 | 8/2004 |
| WO | 2005/002950 A2 | 11/2005 |
| WO | 2006/091245 | 8/2006 |
| WO | 2007/008569 | 1/2007 |
| WO | 2007/082677 A1 | 7/2007 |
| WO | 2010/054194 | 5/2010 |
| WO | 2013/138290 A1 | 9/2013 |

OTHER PUBLICATIONS

Co-pending U.S. Appl. No. 11/115,668, filed Apr. 27, 2005 published as 2005/0260399.
Co-pending U.S. Appl. No. 11/151,957, filed Jun. 14, 2005 published as 2006/0000186.
Co-pending U.S. Appl. No. 11/944,075, filed Nov. 21, 2007, published as 2008/0061602.
Co-pending U.S. Appl. No. 11/767,755, filed Jun. 25, 2007, published as 2007/0257515.
Co-pending U.S. Appl. No. 11/188,586, filed Jun. 25, 2005, published as 2005/0268454.
Co-pending U.S. Appl. No. 11/742,025, filed Apr. 30, 2007, published as 2007/0281523.
Co-pending U.S. Appl. No. 11/020,717, filed Dec. 22, 2004, published as 2005/0166532.
Co-pending U.S. Appl. No. 11/969,389, filed Jan. 4, 2008, published as 2008/0179913.
Co-pending U.S. Appl. No. 11/136,742, filed May 25, 2005, U.S. Pat. No. 7,428,774.
Co-pending U.S. Appl. No. 10/404,831, filed Apr. 1, 2003, U.S. Pat. No. 6,969,551.
Co-pending U.S. Appl. No. 09/939,152, filed Aug. 24, 2001, U.S. Pat. No. 6,855,652.
Co-pending U.S. Appl. No. 12/467,478, filed May 18, 2009, now U.S. Patent Application No. 2010/0289242, Nitsche et al. Nov. 2010.
Co-pending U.S. Appl. No. 10/337,446, filed Jan. 7, 2003, now U.S. Pat. No. 7,318,873.
Co-pending U.S. Appl. No. 11/136,742, filed May 25, 2005, now U.S. Pat. No. 7,428,774.
Co-pending U.S. Appl. No. 11/871,523, filed Oct. 12, 2007, now U.S. Patent Application No. 2008/0254214.
Co-pending U.S. Appl. No. 12/367,152, filed Feb. 6, 2009, now U.S. Patent Application No. 2009/0202294.
Chinese Office Action dated Jul. 7, 2017; Application No. 201480072028.4.

* cited by examiner

Fig-8

CARRIER WITH LOCALIZED FIBROUS INSERT AND METHODS

TECHNICAL FIELD

The present invention relates generally to structural reinforcement, sealing and/or baffling of an article, and more particularly to structural reinforcement of an automotive vehicle by the use of improved reinforcements adhered within a cavity of a transportation vehicle, such as an automotive vehicle.

BACKGROUND

There is an ongoing effort in many industries to lighten the weight of articles. In many instances, this is achieved by the selection of materials that have a lower density, thinner section thicknesses or both, as compared with prior materials or structures. As a result, there is a potential for the weakening of articles, and the consequent need for structural reinforcement.

In the field of automotive vehicle manufacturing it is common to employ structural reinforcements within cavities of the vehicle body structure. For instance, it has become common to employ within a cavity of the vehicle body structure a relatively rigid molded polymeric carrier that carries an activatable material on one or more of its outer surfaces. For certain activatable materials, upon being activated (e.g., by the heat from a coating bake oven), the activatable material can expand and bond to a surface defining the cavity.

In order to selectively control the properties of the article reinforcement structure, it has been taught to use hybrid reinforcement structures that include a combination of multiple materials for the carrier. See, e.g., U.S. Pat. No. 8,430,448, hereby expressly incorporated by reference for all purposes. See also, Patent Cooperation Treaty (PCT) Application No. WO 2010/054194, hereby expressly incorporated by reference for all purposes.

In the automotive vehicle industry, the use of computer modeling (e.g., finite element analysis) has been employed for simulating a vehicle crash, and for modeling how a particular section of a vehicle will respond to the crash.

Notwithstanding the above efforts there remains a need for alternative carrier structures. For example, there remains a need for alternative carrier structures that employ a combination of different materials that, even though they are dissimilar, are still generally compatible (e.g., chemically and/or physically compatible) with each other so that they can be joined together without the need for an adhesive. There also remains an ongoing need for alternative carrier structures that employ a combination of different materials that each contains a substantial polymeric portion (e.g., a non-metallic portion) so that weight savings can be attained. There is also a need for polymeric materials that can be combined to increase the overall modulus and flexural strength of a reinforcement, such that it exceeds that of any of the materials on their own. There also remains an ongoing need for alternative carrier structures that employ a combination of different materials that join together at an interface region that is generally continuous with the portions of the carrier defined by the different respective materials. There also remains an ongoing need for an alternative carrier that can employ one or more localized reinforcement regions by use of a particular material within the carrier, and which may be achieved in the absence of a need for a structural feature (e.g., a rib) for imparting Additional strength to the localized reinforcement.

Examples of composite structures are illustrated in PCT Application No. WO 2007/008569, United States Published Patent Application Nos. 2011/0039470 and 2012/0251863, and U.S. Pat. No. 7,581,932 all incorporated by reference for all purposes. See also, U.S. Pat. Nos. 6,855,652, 7,125,461 and 7,318,873, and United States Published Patent Application Nos. 2003/0039792, 2010/0289242, 2011/0278802, and 2009/0202294, incorporated by reference for all purposes.

The present application also is related to and incorporates by reference for all purposes Great Britain Patent Application No. 1318595.4, filed Oct. 21, 2013.

SUMMARY OF THE INVENTION

One or more of the above needs are met by the present teachings which contemplate improved structures and methods that can be employed advantageously for sealing, baffling and/or structurally reinforcing various articles, and particularly for structurally reinforcing transportation vehicles, such as automotive vehicles.

In one aspect, the teachings contemplate a structural reinforcement for an article, including a carrier that includes: (i) a mass of polymeric material having an outer surface (e.g., an outer surface that is generally smooth and/or continuous); and (ii) at least one consolidated fibrous insert (which may have a three dimensional shaped configuration) having an outer surface and including at least one elongated fiber arrangement having a plurality of ordered fibers (e.g., having a mass of continuous fibers, which may be axially aligned), which may be arranged in a predetermined manner. The fibrous insert is envisioned to adjoin the mass of the polymeric material in a predetermined location for carrying a predetermined load that is subjected upon the predetermined location (thereby effectively providing localized reinforcement to that predetermined location). The fibrous insert and the mass of polymeric material are of compatible materials, structures or both, for allowing the fibrous insert to be at least partially joined to the mass of the polymeric material. The fibrous insert may receive a second polymeric material. The second polymeric material may be a liquid material that saturates the insert. The second polymeric material may include a thermoplastic epoxy material. The second polymeric material may include a liquid epoxy resin. The second polymeric material may include monoethanolamine. The second polymeric material may include a liquid epoxy resin and monoethanolamine in a ratio of about 1:1.

Disposed upon at least a portion of the carrier may be a mass of activatable material (e.g., an expandable material). For instance, the mass of activatable material may be selectively applied over at least a portion of one or both of the outer surface of the mass of the polymeric material or the fibrous insert. The mass of activatable material may be capable of activation for expansion by an external stimulus (e.g., to at least partially fill a gap or cavity) and also may be capable of curing to form an adhesive bond to at least one surface of the article. Desirably, the outer surface of the fibrous insert is at least partially coplanar and continuous with the outer surface of the mass of polymeric material.

In another aspect, the teachings contemplate a method for making a structural reinforcement for an article. The method can include a step of inserting at least one fibrous insert (which may be located within or coated with a polymeric material, may be consolidated and/or may have a predetermined three dimensional shaped configuration) having an outer surface and including at least one elongated fiber arrangement (e.g., having a mass of continuous fibers, which may be axially aligned) into a cavity of a tool. A step may be employed of molding a mass of polymeric material in contact with the fibrous insert so that a resulting molded mass of polymeric material integrally adjoins the fibrous insert and the outer surface of the fibrous insert (which may be generally smooth and/or continuous) is at least partially coplanar and continuous with the outer surface of the resulting molded mass of polymeric material. Another step may be employed of applying a mass of activatable material selectively over at least a portion of one or both of the outer surface of the resulting mass of the polymeric material or the fibrous insert. The mass of activatable material may be capable of activation for expansion by an external stimulus to at least partially fill a gap or cavity and may be capable of curing to form an adhesive bond to at least one surface of the article.

Parts made in accordance with the present teachings have application in transportation vehicles (e.g., automotive vehicles). For example, as noted above, such parts may employ an activatable material that, upon activation (e.g., by a suitable energy source, such as heat from a paint bake oven), will expand and cure to form a foamed material. The resulting activated material may have application for imparting structural rigidity or reinforcement (i.e., it may be what is regarded as a structural foam; examples of structural foam include, without limitation, those available from L & L Products, Inc. under the names L5204, L5207, L5214, L5234, L5235, L5236, L5239, L5244, L5505, L5510, L5520, L5540, L5800, L5810 and L8514.). The resulting activated material may have application for sealing and/or noise abatement. The resulting activated material may be expanded to at least about 50%, 100%, 200%, 400%, 600%, or even 1000% of its original volume. The resulting activated material may be expanded from its original volume, but in an amount that is below about 2500%, 2000% or even below about 1500% of its original volume.

Advantageously, the teachings herein provide an improved approach to the structure and/or formation of carriers in that multiple dissimilar materials may be employed and will exhibit a unitary structure that is generally continuous throughout the carrier. Exposed surfaces of the carriers of the present teachings may be generally smooth and/or continuous. For instance, contemplated within the teachings herein are carriers that have one or more polymeric portions, a localized reinforcement portion and an interface portion between the polymeric portion and the localized reinforcement portion wherein the polymeric portion, the interface portion and the localized reinforcement portion are a generally smooth and/or continuous structure. The interface portion may include an interpenetrating network defined by the polymeric materials of the polymeric portion and the localized reinforcement portion. The interface portion may include chemical bonds between the polymer of the polymeric portion and the polymer of the localized reinforcement portion. In this manner, the resulting carrier may thus exhibit no knit lines visible to the naked eye. The resulting carrier may also exhibit no voids or discontinuities visible to the naked eye across the interface portion.

The teachings herein also make it possible to design a range of carriers that include localized reinforcement regions that can be readily manufactured and customized.

BRIEF DESCRIPTION OF THE DRAWINGS

FIG. 4b is a bottom perspective view of the carrier of FIG. 4a.

FIG. 6a is a perspective view of an illustrative fibrous insert in accordance with the present teachings.

FIG. 6b is a perspective view of an illustrative part incorporating the fibrous insert of FIG. 6a.

FIG. 7a is a perspective view of another illustrative fibrous insert in accordance with the present teachings.

FIG. 7b is a perspective view of an illustrative part incorporating the fibrous insert of FIG. 6a.

DETAILED DESCRIPTION

The present teachings meet one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present application claims the benefit of the filing dates of U.S. Provisional Application Ser. No. 61/916,884, filed on Dec. 17, 2013 and PCT Application No. PCT/US14/61531, filed Oct. 21, 2014, the contents of these applications being hereby incorporated by reference for all purposes.

In one aspect of the present teachings there is contemplated a structural reinforcement for an article. The structural reinforcement includes a carrier that includes a mass of polymeric material having an outer surface and including a first polymeric material (e.g., a first thermoplastic material). The carrier also includes at least one consolidated fibrous insert (which may have a predetermined ordering of fibers within the insert and/or may have a three dimensional shaped configuration) having an outer surface. The at least one consolidated fibrous insert includes at least one elongated fiber arrangement (e.g., having a mass of continuous fibers, which may be in an ordered arrangement, such as by being generally axially aligned relative to each other) distributed in a cohesive mass of a second polymeric material (e.g., a second thermoplastic material). The fibrous insert and associated second polymeric material may adjoin the mass of the first polymeric material in a predetermined location for carrying a predetermined load that is subjected upon the predetermined location. The fibrous insert, the second polymeric material and the mass of first polymeric material include compatible materials, structures or both, for allowing the fibrous insert to be at least partially joined to (e.g., form a single phase with or be miscible in) the mass of the first polymeric material. The structural reinforcement may also include a mass of activatable material selectively applied over at least a portion of one or both of the outer surface of the mass of the polymeric material or the fibrous insert (e.g., on exterior peripheral surface of the carrier, within a cavity of the carrier, or both). The mass of activatable material is capable of activation for expansion by an external stimulus (e.g., heat, moisture, radiation or otherwise) and is capable of curing to form an adhesive bond to at least one surface of the article. Desirably the outer surface of the fibrous insert may be at least partially coplanar and continuous with the outer surface of the mass of polymeric material.

As indicated, the first and second polymeric materials may be thermoplastic. For example, the first and second materials may be a polyamide, a polyolefin (e.g., polyethylene, polypropylene, or otherwise), a polycarbonate, a polyester (e.g., polyethylene terephthalate), a thermoplastic polyurethane, or any combination thereof. One or more of the first and second polymeric materials may include an amine, such as monoethanolamine. One or more of the first and second polymeric materials may include an epoxy resin material, which may be a liquid epoxy resin. It is preferred to employ a polyamide (e.g., polyamide 6, polyamide 6,6, polyamide 9, polyamide 10, polyamide 12 or the like) as the first polymeric material. The first and the second polymeric materials and also the fibrous insert may be generally compatible with each other in that they are capable of forming a mechanical or other physical interconnection (e.g., a microscopic interconnection) between them, they are capable of forming a chemical bond between them, or both. For example, the first and second materials may be such that they fuse together (e.g., in the absence of any adhesive) when heated above their melting point and/or their softening point. The first polymeric material, the second polymeric material or both may be filled with chopped fibers (e.g., chopped glass fibers), which may be present in amount of about 25 to about 40 (e.g., about 30 to about 35) weight percent chopped fibers. The average length of such fibers may be below about 20 mm, below about 10 mm or even below about 5 mm. They may be randomly oriented. The first and second materials may be free of any metallic materials.

The fibrous insert may include one or more layers (e.g., they may have 2, 3, 4, 6 or more layers) that are consolidated in the sense that they include a plurality of individual fibers that are distributed in a cohesive mass of the second polymeric material. The individual fibers may be distributed in a predetermined ordered arrangement within a matrix of the second polymeric material. Preferably at least a portion of the fibers are ordered in their arrangement (e.g., in a generally ordered relationship relative to each other, such as generally parallel or unidirectional or otherwise generally axially aligned), and thus are not randomly distributed in the second polymeric material. Multiple layers may be consolidated together so that a cohesive mass, including the multiple layers, is formed. The multiple layers may be consolidated so as to form a predetermined shape in the form of a three-dimensional shaped insert. For instance, the fibrous insert may employ a plurality of layers that include a plurality of elongated fibers (e.g., having a length of at least 1 cm, 3 cm or even 5 cm or longer) that are oriented generally parallel or generally unidirectionally to each other and are distributed in a generally continuous polymeric matrix (e.g., in a continuous matrix of the second polymeric material). The fibers may be mineral fibers (e.g., glass fibers, such as E-glass fibers, S-glass, B-glass or otherwise), polymeric fibers (e.g., an aramid fiber, a cellulose fiber, or otherwise), carbon fibers, metal fibers, natural fibers (e.g., derived from an agricultural source), or otherwise. Desirably the fibers are glass fibers. The plurality of elongated fibers may be oriented generally parallel to each other. They may be braided. They may be twisted. Collections of fibers may be woven and/or nonwoven. The fibers may have an average diameter of about 1 to about 50 microns (e.g., about 5 to about 25 microns). The fibers may have a suitable sizing coating thereon. The fibers may be present in each layer, or in the fibrous insert generally, in an amount of at least about 20%, 30%, 40% or even 50% by weight. The fibers may be present in each layer, or in the fibrous insert generally, in an amount below about 90%, 80%, or even about 70%, by weight. By way of example, the fibers may be present in each layer, or in the fibrous insert, in an amount of about 50% to about 70% by weight. Fiber contents by weight may be determined in accordance with ASTM D2584-11. Tapes and/or sheets for the layers of the fibrous insert may be made by extrusion, pultrusion or otherwise. In this manner, it may be possible to achieve ordering of the fibers in the tapes and/or sheets. The method herein may include a step of impregnating a fibrous mass with the material of the polymeric matrix and passing the resulting impregnated material through a die (e.g., a heated die) so that the fibrous mass is coated with a generally continuous mass of the material of the polymeric matrix. In this manner, it is also possible to achieve desired ordering of fibers relative to each other.

Each layer of the fibrous insert may be in the form of a sheet, a tape or otherwise. Fibers in the sheet and/or tape preferably may have an ordered relationship relative to each other. For example, the fibers may be generally parallel with each other and/or oriented unidirectionally. When consolidating multiple layers of sheet, tape or other form of layer to form a multi-ply fibrous insert, it is preferred that at least one layer of the fibrous insert exhibits an ordered relationship, as opposed to a random relationship, such as is found in fiber mats, which typically employ chopped fibers that are randomly laid across each other.

It is possible that the layers of the fibrous insert are provided as being wound on a reel. Each layer may have a thickness of at least about 0.1 mm or at least about 0.2 mm. Each layer may have a thickness below about 0.5 mm or below about 0.4 mm. For instance, each layer may be about 0.2 to about 0.3 mm in thickness. Some or all of the individual layers may be anisotropic in its mechanical properties. For example, it may exhibit a relatively high flexural modulus and/or strength in a longitudinal direction, but a lower flexural modulus and/or strength in a transverse direction, or vice versa.

The fibrous insert may include a plurality of woven strips. For example, it may include a plurality of strips that are cross woven, each strip having a width of at least about 1 mm, at least about 2 mm, or even at least about 3 mm. It may include a plurality of strips that are cross woven, each having a width below about 10 mm, below about 8 mm, or even below about 6 mm. The woven strips may be held together by a polymeric matrix material, e.g., a continuous matrix of the polymeric material of the insert. Thus, the strips are fixed in a predetermined position relative to each other by virtue of the polymeric material. It is preferred that at least some of the strips may each include a plurality of elongated fibers arranged in an ordered relationship relative to each other, desirably within a continuous matrix of polymeric material. However, it is possible that one or more strips may include fibers having a random orientation relationship relative to each other, such as is derived from typical fiber mats. Strips for forming weaves may be made by slitting a tape, sheet or other form to an appropriate width to form strips. Alternatively, it may be possible that the strips are pultruded, extruded or otherwise formed (as described herein) in the desired width.

The material defining the fibrous insert may exhibit a flexural strength per ASTM D790-10 of at least about 450 MPa (e.g., it may range from about 500 to about 1100 MPa). The material of the fibrous insert may exhibit a flexural modulus per ASTM D790-10 of at least about 5 GPa, 10 GPa, 20 GPa, or even at least about 25 GPa (e.g., it may range from about 30 to about 35 GPa).

The fibrous insert may employ fully densified polymer for the polymeric matrix. The fibrous insert may have a void content that is below about 10% by volume of the insert, and more preferably below about 5% or even below about 2% or 1% as measured by ASTM D2734-09. The fibrous insert may have a density that is below about 40% the density of steel, below about 33% the density of steel, or even below about 25% the density of plain carbon steel.

The fibrous insert may be made to include a plurality of adjoining layers. The adjoining layers may have fiber orientations that are the same or different relative to each other. The fibrous insert may include a woven layer adjoining a non-woven layer. The fibrous insert may include a woven layer adjoining another woven layer. The weave pattern of woven layers within the fibrous insert may be the same or may vary between such woven layers. The width of strips may vary between adjoining layers. The thickness of adjoining layers may be the same or different.

Examples of weave patterns include plain weaves, twill weaves, or otherwise. Overlapping strips may be woven generally orthogonal to one another or at some other angle. The weave may include a plurality of warp and weft strips. The ratio of warp to weft strips may range from about 30:70 to about 70:30. For example it may be about 50:50. It is possible that strips of the warp and weft members may have generally the same width. The warp strip and weft strip widths may vary relative to each other by 10%, 20%, 30% or more. The warp strip and weft strip widths may vary relative to each other by less than about 70%, 60%, 50% or less.

Each adjoining layer of tape and/or sheet in the fibrous inserts herein may be oriented so that it has fibers (i.e., the fibers that are embedded in the polymeric matrix of the tape and/or sheet) aligned in a different predetermined direction relative to fibers of an adjoining layer. Fibers in one layer may be generally at an angle relative to fibers in an adjoining layer (e.g., the axis of fiber orientation as between layers may differ from about 10 to about 90°, such as in the form of an X-ply). For example, one multiple layer structure may include one layer that may have fibers oriented in a first direction of a first plane, and an adjoining layer oriented with its fibers generally in a second plane parallel to the first plane, but at an approximately 90 degree angle.

Desirably each of the adjoining layers are joined together as a cohesive mass. For instance, each of the layers may be bonded together by the polymeric material of the respective layers to form a series of continuous layers. The layers may be bonded together in the absence of any adhesive.

The fibrous insert may have one or more structural features incorporated therein or attached thereto. For example, one or more fasteners may be employed (e.g., one or more threaded fasteners). One or more lugs may be formed or integrated into the fibrous insert (e.g., for providing a gap for the passage of a coating fluid). One or more rivets (e.g., a self-piercing rivet, a blind rivet or both) may be integrated into the insert. One or more metal blanks may be integrated into the insert, which may be adapted to provide a location on a resulting part for spot welding. One or more studs may be integrated into the insert (e.g., having a base that may have apertures defined therein, which is located within or on a surface of the fibrous insert and which has a post (e.g., a threaded post) that extends outward from the base).

As indicated the fibrous inserts may have a predetermined shape. The shape may be the result of one or more calculations performed during a step of computer simulation of a crash, a certain stress state or otherwise, and may be selected so as to provide additional localized reinforcement in a predetermined region of the part that will be subjected to a predicted stress condition that is determined from such calculations. The fibrous inserts herein may include one or any combination of a generally sinousoidal geometry over some or all of its length, a pair of spaced apart walls that are joined together by a cross wall, one or more ledges and/or steps, a concave surface portion, a convex surface region, or one or more apertures. As indicated, the fibrous inserts herein may have a three dimensional configuration, in contrast with a generally planar configuration.

The characteristics of the fibrous insert can vary from application to application. One benefit of the present teachings is the layers of the fibrous insert can be selected to meet the needs of a particular application (e.g., in response to modeling by computer simulation (such as computer crash or stress state simulation)). The insert can be individually built up to include a plurality of layers based upon the performance demanded by the application. Moreover, another benefit of the teachings herein is that localized reinforcement can be achieved by locating the inserts in particular locations that are indicated as requiring additional local reinforcement (e.g., in response to modeling by computer simulation (such as computer crash or stress state simulation)). The teachings herein thus afford the skilled person with a surprisingly expanded ability to selectively tune performance of structural reinforcements. The teachings also contemplate the use of modeling by computer simulation to determine the location at which a carrier is expected to carry a predetermined load in a crash or under a certain stress state. Based upon the results of such modeling, the location at which a fibrous insert should be located can be determined. Also, based upon the results of such modeling, the orientation of fibers and/or the selection of respective adjoining layers of tape or sheet in a fibrous insert can be ascertained. Parts can thereafter be made that are based upon the designs resulting from such modeling. Methods employing such steps are thus within the present teachings as well.

The carriers of the structural reinforcements may be such that the outer surface of the fibrous insert is generally coplanar with the outer surface of the mass of polymeric material. This may be over some or all of the perimeter of the fibrous insert. It is also envisioned that the fibrous insert may have opposing surfaces that are each exposed and thus visible in the resulting part. For instance, the fibrous insert may have an exposed outer surface and an exposed inner surface. Thus, the fibrous insert may adjoin the mass of polymeric material only along one or more side edges of the fibrous insert. The resulting visible surfaces of the carrier may be substantially free of knit lines or other imperfections that could provide a source of localized weakening of the carrier.

The second polymeric may be applied directly onto the fibrous insert. The second polymeric material may be a liquid poured onto the fibrous insert until the insert is saturated with the second polymeric material. The liquid absorbed by the fibrous insert may account for at least about 30% and less than about 70% of the total weight of the insert after saturation. The saturated insert may polymerize at room temperature or with the addition of heat, such that a rigid solid composite is formed. The resulting composite may then receive the first polymeric material by locating the composite into a tool and molding the first polymeric material (which may be a nylon material) about the composite.

As appreciated from the above, the carrier may have (i) a polymeric portion defined by the mass of first polymeric material, (ii) a localized reinforcement portion defined by the at least one fibrous insert, and (iii) an interface portion between the polymeric portion and the localized reinforcement portion wherein the polymeric portion, the interface portion and the localized reinforcement portion are a generally continuous structure. The interface portion may include (i) an interpenetrating network defined by the first and second polymeric materials, (ii) chemical bonds between the first and second polymeric materials, or both (i) and (ii).

One or more sides of the activatable material may be tacky. Though it is also possible that one or more sides will be generally tack free to the touch at room temperature. One or more mechanical fasteners may be employed by attaching to or being formed integral with the activatable material, the carrier, or both.

Suitable materials that may be employed for the activatable material include expandable materials and materials that do not expand. However, it is contemplated that the activatable material can be activated to form a foam. For instance, the material may be activated to form a structural foam (e.g., the material may include an epoxy ingredient). The material may be activated to form an acoustic foam. The material may be activated to flow for purposes of sealing a region within a cavity. The material may include a combination of a material that is activatable to expand and a material that is not activatable to expand.

The structural reinforcement of the present teachings may be employed for structurally reinforcing an article, such as by locating the structural reinforcement within a cavity of the article and activating the activatable material so that it expands and bonds to a surface of the article. The structural reinforcement may also be employed to seal and/or baffle the cavity. In a preferred application, the structural reinforcement is employed to reinforce a transportation vehicle, such as an automotive vehicle.

By way of example, the structural reinforcement may be positioned within a cavity of a transportation vehicle (e.g., an automotive vehicle) prior to coating the vehicle. The activatable material may be activated when subjected to heat during paint shop baking operations. In applications where the activatable material is a heat activated, thermally expanding material, an important consideration involved with the selection and formulation of the material comprising the activatable material is the temperature at which a material reaction or expansion, and possibly curing, will take place. For instance, in most applications, it is undesirable for the material to be reactive at room temperature or otherwise at the ambient temperature in a production line environment. More typically, the activatable material becomes reactive at higher processing temperatures, such as those encountered in an automobile assembly plant, when the material is processed along with the automobile components at elevated temperatures or at higher applied energy levels, e.g., during paint or e-coat curing or baking steps. While temperatures encountered in an automobile assembly operation may be in the range of about 140° C. to about 220° C., (e.g., about 148.89° C. to about 204.44° C. (about 300° F. to 400° F.)), body and paint shop applications are commonly about 93.33° C. (about 200° F.) or slightly higher. Following activation of the activatable material, the material will typically cure. Thus, it may be possible that the activatable material may be heated, it may then expand, and may thereafter cure to form a resulting foamed material.

As indicated, the teachings herein also relate to a method for making a carrier for an activatable material (e.g., for structural reinforcement for an article). The method may include a step of inserting at least one fibrous insert (which may be consolidated at the time of the step of inserting) having an outer surface and including at least one elongated fiber arrangement into a cavity of a tool. A mass of polymeric material may be molded in contact with the fibrous insert so that a resulting molded mass of polymeric material integrally adjoins the fibrous insert (which is consolidated in its final state) and the outer surface of the fibrous insert is at least partially coplanar and continuous with the outer surface of the resulting molded mass of polymeric material. A mass of activatable material may be applied (e.g., overmolded, mechanically attached or otherwise) selectively over at least a portion of one or both of the outer surface of the resulting mass of the polymeric material or the fibrous insert. Consistent with the teachings above, the mass of activatable material may be capable of activation for expansion by an external stimulus (e.g., to at least partially, if not completely, fill a gap or a cavity) and may be capable of curing to form an adhesive bond to at least one surface of the article to which it is attached.

The method may include a step of at least partially shaping the fibrous insert after it is placed in the cavity of the tool. For example, the tool may be preheated to a temperature above the softening temperature and/or the melting temperature of a polymer of the at least one fibrous insert prior to placing the fibrous insert in the cavity of the tool. The method may include a step of at least partially shaping the fibrous insert after it is placed in the cavity of the tool and while molding the mass of polymeric material. For instance, heat and/or pressure that results from introducing the mass of polymeric material into the cavity (e.g., by injection molding), may at least partially cause the fibrous insert to assume a shape dictated by one or more of the walls defining the cavity. Thus it is possible that the fibrous insert is not preformed prior to placement in the cavity, and it assumes its final shape only while in the cavity. Of course, it is also possible that the fibrous insert is preformed prior to placement in the cavity.

The fibrous insert, prior to the inserting step, may be provided in the form of one or more layers of a tape and/or sheet, in which the fibers may be fixed in position relative to each other (e.g., as a result of consolidation, by which a cohesive mass of the fibers distributed in a continuous polymeric matrix is formed). The method may thus include a step of fabricating the fibrous insert to include a plurality of layers of tape and/or sheet. For example, the method includes a step of consolidating a plurality of layers of tape and/or sheet while the plurality of layers is subjected to heat and optionally an elevated pressure. For instance, a temperature may be employed that is above the melting and/or softening point of the polymer of the tape and/or sheet to cause two or more adjoining layers to fuse and remain joined together upon cooling. A pressure of about 0.1 to about 1 MPa may be applied (e.g., about 0.2 to about 0.6 MPa). The temperature and pressure may be employed for a desired amount of time to achieve essentially complete densification. It will be appreciated that the teachings afford for the formation of various consolidated insert structures.

The fibrous insert may be thermoformed to form a predetermined shape. The fibrous insert may be thermoformed during a step of consolidating. A resulting thrermoformed fibrous insert may thereafter be placed in a tool cavity and molten thermoplastic polymeric material may be introduced in contact with it.

The step of molding may include a step of introducing molten polymeric material into the tool cavity by way of a gate that is positioned in generally opposing relationship with the at least one fibrous insert. In this manner, upon introduction into the cavity, the molten polymer contacts the fibrous insert before it contacts a wall defining the cavity.

Carriers made in accordance with the present teachings may have a wall having a first surface and a generally opposing second surface. The wall may have a thickness ranging from about 0.2 to about 6 mm (e.g., about 1.5 to about 4 mm). At select regions within a carrier, it is possible that at least about 20%, 40%, 60%, 80% or even 100% of the wall thickness is defined by the fibrous insert. The fibrous insert may have a contoured outer surface portion that is visibly exposed on the carrier. The fibrous insert may have a generally flat outer surface portion that is visibly exposed on the carrier. The first surface and the second surface may be generally parallel to each other.

The fibrous insert may occupy at least about 10%, 20%, 30% or even 40% by weight of the overall carrier. The fibrous insert may be less than about 90%, 80%, or even 70% by weight of the overall carrier.

Thus it is possible that at least a portion of the first surface and the second surface are each visibly exposed and will be composed of the fibrous insert. The carriers may have one or more additional structural reinforcements or other structural features, such as one or more ribs, bosses or otherwise. These features may be free of or they may include a fibrous insert in accordance with the present teachings.

Parts herein may be employed for any of a number of purposes. For example, they may be employed to structurally reinforce a transportation vehicle such as an automotive vehicle. In this regard, a part may be placed in a cavity of a vehicle body structure, such as a vehicle frame. After applying an e-coat layer to the vehicle body (e.g., within the cavity), the part may be subjected to heat from a bake oven, which causes the activatable material to activate (e.g., expand and fill the cavity), and become bonded to the vehicle body.

Figure 1:
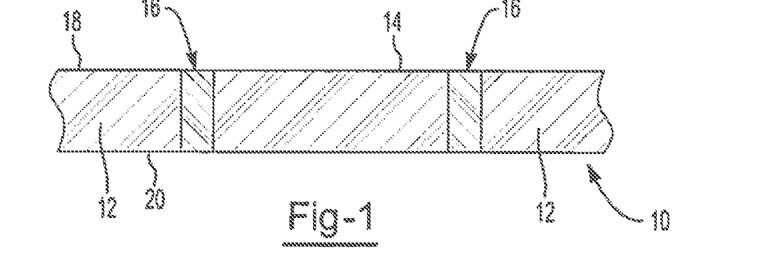
FIG. 1 is a side sectional view of a portion of one illustrative part in accordance with the present teachings.

FIGS. 1-5 illustrate examples in accordance with the present teachings. With reference to FIG. 1, there is seen a carrier 10 that has one or more masses 12 of a first polymeric material. A fibrous insert 14 is shown joined to the one or more masses along an edge of the insert. An interface portion 16 is depicted (in exaggerated form for purposes of illustration; for simplicity such interface is omitted from the remaining drawings, though it should be appreciated that it may still exist in such embodiments). The carrier has an upper surface 18 and a lower surface 20. The fibrous insert 14 spans from the upper surface to the lower surface so that the fibrous insert is exposed visibly top and bottom. FIG. 1 omits any activatable material. However, activatable material can be located over either or both of the mass 12 or the fibrous insert 14.

Figure 2:
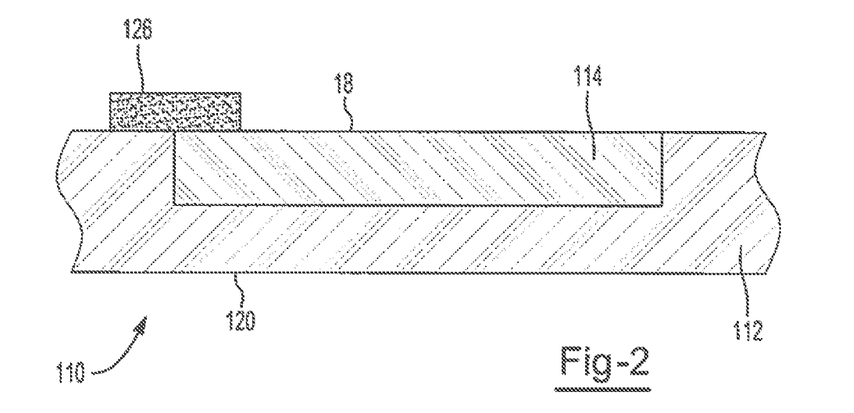
FIG. 2 is a side sectional view of a portion of another illustrative part in accordance with the present teachings.

FIG. 2 depicts a carrier 110 having a mass of polymeric material 112 and a fibrous insert 114, in which only the upper surface of the fibrous insert is exposed. A lower surface and side edges adjoin the mass of polymeric material. The interface region is omitted in this depiction, though it may be present. In this drawing, an expandable material 126 is located over both the mass of the polymeric material and the fibrous insert. However, it can be located over one or the other as well.

Figure 3:
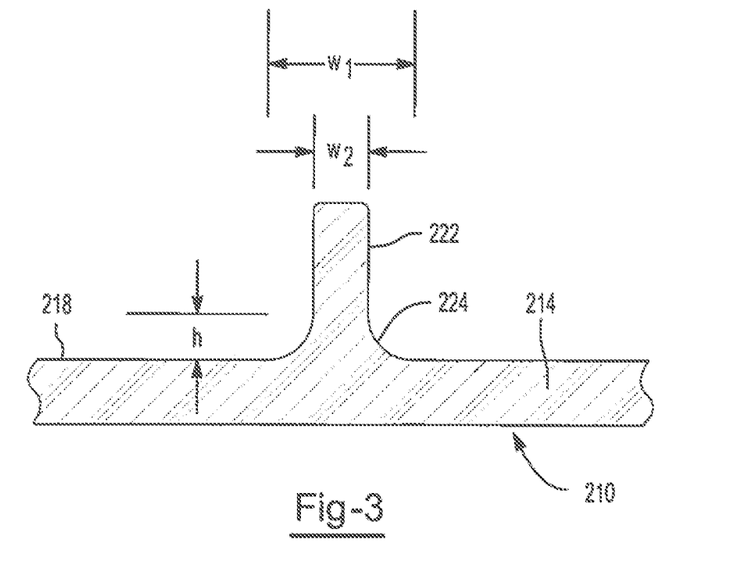
FIG. 3 is a side sectional view of a portion of yet another illustrative part in accordance with the present teachings.

FIG. 3 illustrates an example of a carrier 210 having a fibrous reinforcement portion 214 with an upper surface 218, from which a rib 222 projects, which is made of a mass of polymeric material (e.g., the same type of material as is otherwise present in the carrier to which the insert adjoins). The rib includes an outwardly projecting portion having a width $w_1$, and an enlarged neck region that has a width (at its largest dimension) $w_2$ that is larger than the width $w_1$, such as by an amount of at least about 10%, 20% or 30%. The width $w_2$ may be larger than the width $w_1$, such as by an amount of no greater than about 100%, 80% or 60%. A similar rib structure can be employed in the embodiment of FIG. 2.

Figure 4A:
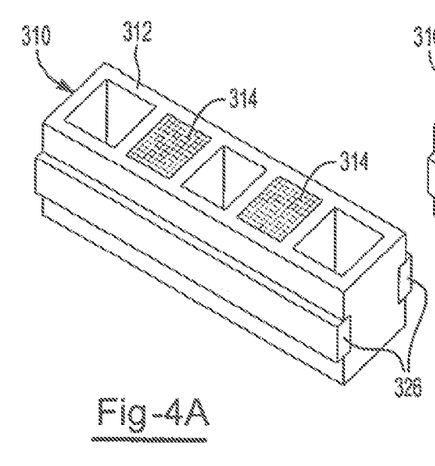
FIG. 4a is a top perspective view of one illustrative carrier in accordance with the present teachings.
Figure 4B:
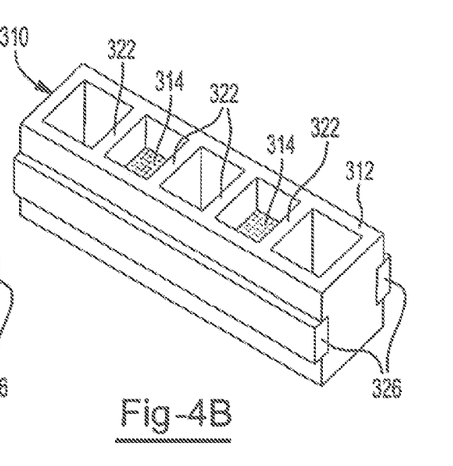

FIGS. 4a and 4b illustrate two views of an illustrative carrier 310 that includes a mass of polymeric material 312 and a pair of fibrous inserts 314. In this instance the fibrous inserts have upper and lower surfaces that are exposed. Though it is possible to employ a structure like in FIG. 2, in which only an upper surface is exposed. A plurality of ribs 322 are employed (ribs are shown in transverse disposition relative to a longitudinal axis (however for all of the embodiments herein, ribs may run longitudinally, transverse, diagonally, or any combination thereof; ribs may also be arcuate)). An activatable material 326 is shown. Though shown in a groove, it may rest on an outer surface or otherwise be carried on the carrier for all of the embodiments herein.

Figure 5:
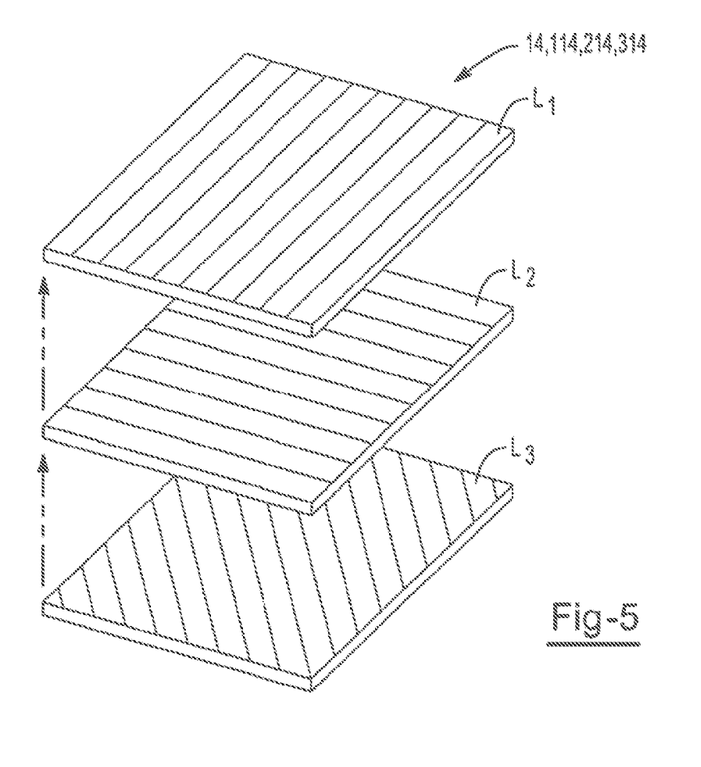
FIG. 5 is an exploded perspective view of one illustrative lay-up of a fibrous insert of the present teachings.

FIG. 5 illustrates an example of how fibrous inserts 14, 114, 214 or 314 can have multiple layers with two or more adjoining layers having different fiber orientations. Though shown as unidirectionally oriented in this example, strips of impregnated fibers may also be provided as a woven layer. Other orientations than those disclosed in FIG. 5 are possible. For example three layers of uniaxially oriented fibers may be oriented at 0/90/0 degrees relative to each other, or five layers may be oriented at 0/45/90/45/0 degrees relative to each other. Other orientations are also possible.

Figures 6A, 6B:
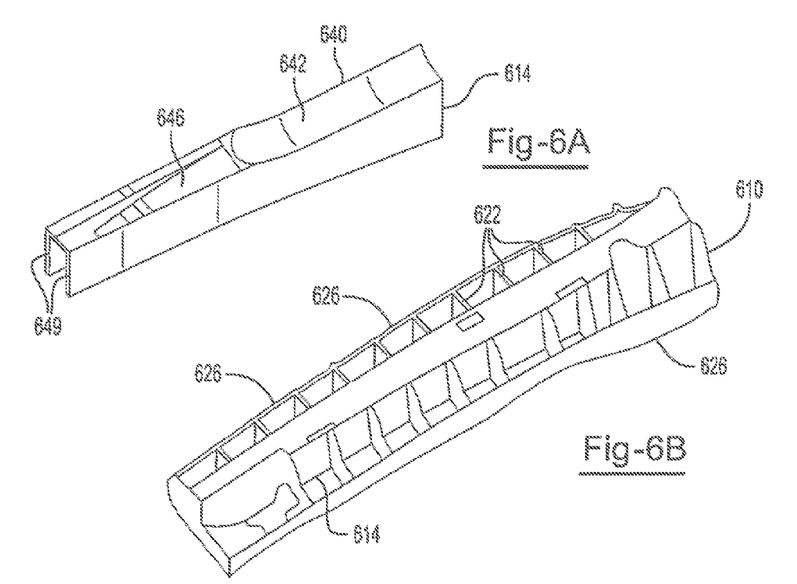

FIGS. 6a and 6b illustrate an example of one part in accordance with the present teachings. The part includes a carrier 610 that is shown as a molded part. It includes a fibrous insert 614. The carrier includes a plurality of ribs 622. Activatable material 626 is applied over a portion of the carrier, and is shown as partially covering the insert 614. The insert 614, which is overmolded for defining the carrier 610, includes an arcuate surface, and specifically a concave surface portion 640. In the embodiment shown, it is located toward an end of the insert 614. The insert 614 also includes a through-hole aperture 642. The insert includes a pair of opposing walls 644 (which may be generally parallel or otherwise oriented) and a cross wall 646. The insert spans a central portion of the carrier.

Figures 7A, 7B:
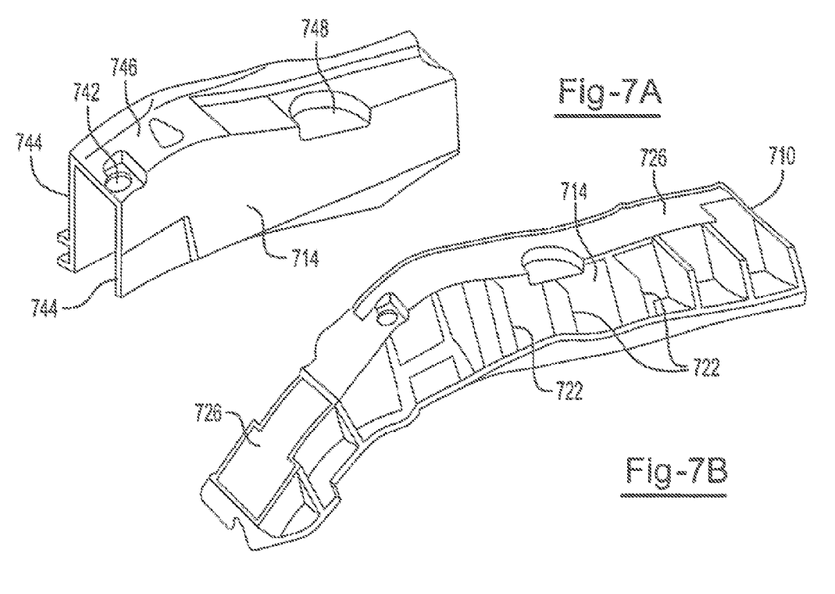

FIGS. 7a and 7b illustrate an example of another part in accordance with the present teachings. The part includes a carrier 710 that is shown as a molded part. It includes a fibrous insert 714. The carrier includes a plurality of ribs 722. Activatable material 726 is applied over a portion of the carrier, and is shown as partially covering the insert 714. The insert 714, which is overmolded for defining the carrier 710, includes an arcuate surface portion 740. In the embodiment shown, it is located toward an end of the insert 714. The insert 714 also includes a through-hole aperture 742. The insert includes a pair of opposing walls 744 (which may be generally parallel or otherwise oriented) and a cross wall 746. At least one step 748 is defined in the insert.

Figure 8:
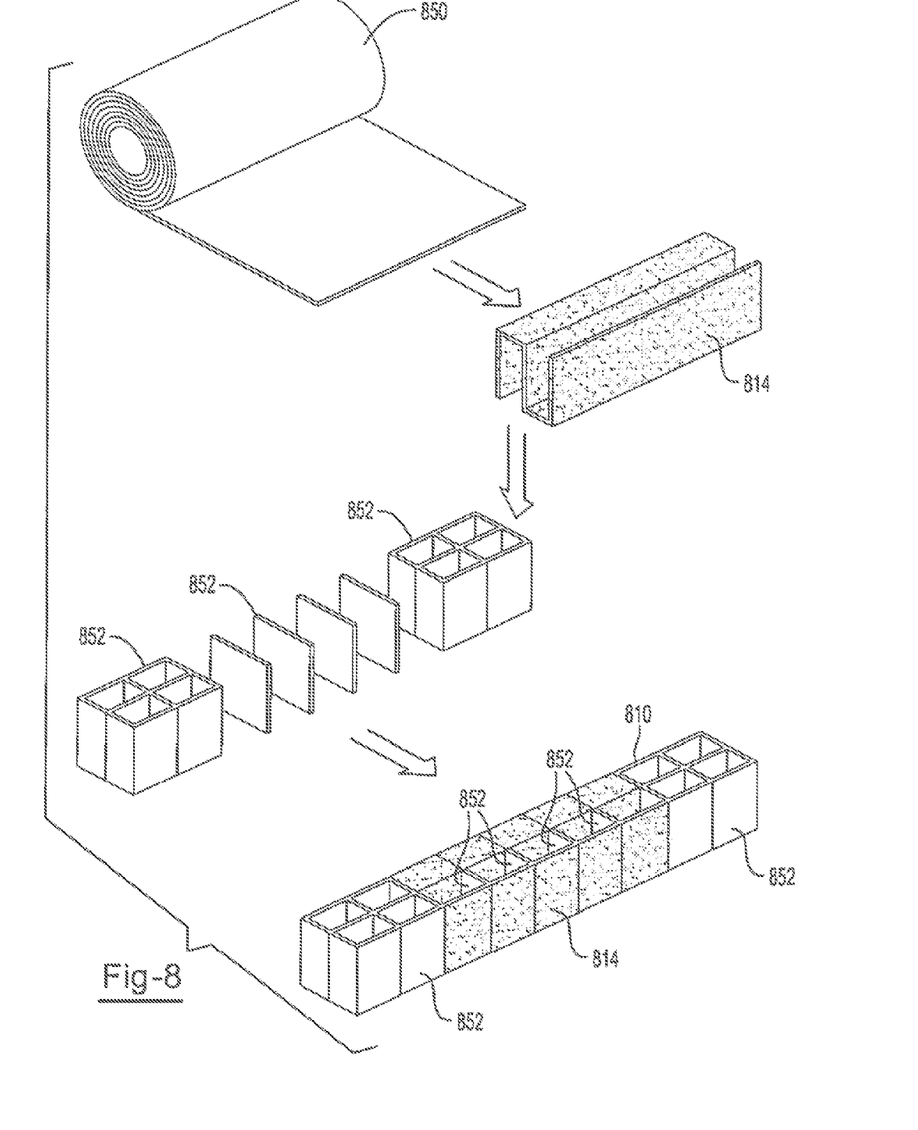
FIG. 8 is a schematic illustrating the formation of an illustrative part in accordance with the present teachings.

FIG. 8 illustrates schematically how a carrier may be made in accordance with the present teachings. A reel of fibrous material 850 may supply the material to define an insert 814, shown as being sinousoidal. The insert may be overmolded to define overmolded portions 852 (e.g., including a plurality of ribs) of a resulting carrier 810. The resulting carrier, thus includes the insert 814 and the overmolded portions 852.

It will be appreciated that, even though the embodiments of FIGS. 1 through 8 are shown separately, features of one may be combined with features of another and remain within the present teachings. The depictions therein thus should be regarded as generalized and applicable to the teachings as a whole herein.

The teachings herein are illustrated in connection with a carrier for a structural reinforcement, in which the carrier is generally elongated (e.g., it may be at least about 25 mm long, at least about 50 mm long or even at least about 100 mm long). However, the teachings are not intended to be so limiting. The teachings also contemplate their usage for forming carriers for baffling and/or sealing. The carriers may thus have lengths that are shorter than about 25 mm (e.g. about 15 mm or shorter). The carriers may be longer than they are wide. The carriers may be wider than they are long.

As can be appreciated from the teachings herein, various benefits and/or advantages may be realized. For example, parts may be prepared that have a carrier that is made of a material free of a thermosetting plastic. Parts may be prepared that have at least a portion of the activatable material located over and in contact with a fibrous insert of the present teachings.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for ail purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A device comprising:
   a. a carrier that includes:
      i. a mass of a first polymeric material having a perimeter including opposing outer surfaces, wherein the first polymeric material is a polyamide material; and
      ii. at least one fibrous insert having opposing outer surfaces and including at least one elongated fiber arrangement having a plurality of ordered fibers distributed in a predetermined manner in a second polymeric material, wherein the second polymeric material is a thermoplastic material that saturates the at least one fibrous insert and is liquid upon contact with the at least one fibrous insert, the second polymeric material being from 30% to 70% of the total weight of the at least one fibrous insert after saturation, the at least one fibrous insert adjoining the mass of the first polymeric material in a predetermined location for carrying a predetermined load that is subjected upon the predetermined location; wherein the at least one fibrous insert and the mass of the first polymeric material include compatible materials, structures, or both, for allowing the at least one fibrous insert to be at least partially joined to the mass of the first polymeric material; and b. a mass of activatable adhesive material selectively applied over at least a portion of the perimeter of the mass of the first polymeric material and substantially free of any direct contact with the at least one fibrous insert, the mass of activatable adhesive material being positioned within a groove along the perimeter of the mass of the first polymeric material, wherein the mass of activatable adhesive material is activated for expansion and/or adhesion by an external stimulus and cures to form an adhesive bond to at least one surface of a cavity receiving the carrier; and wherein the opposing outer surfaces of the at least one fibrous insert are coplanar with the opposing outer surfaces of the mass of the first polymeric material, and the opposing outer surfaces of the at least one fibrous insert are exposed and visible in the device; and wherein the at least one fibrous insert is free of extension beyond the perimeter of the mass of the first polymeric material.

2. The device of claim 1, wherein the polyamide material is selected from the following: polyamide 6, polyamide 6,6, polyamide 9, polyamide 10, and polyamide 12.

3. The device of claim 1, wherein the at least one fibrous insert includes at least one layer in a form of a tape material.

4. The device of claim 1, wherein the at least one elongated fiber arrangement of the at least one fibrous insert and the mass of the first polymeric material include a plurality of glass fibers that are made generally of the same material.

5. The device of claim 1, wherein the at least one elongated fiber arrangement is a woven fiber arrangement.

6. The device of claim 1, wherein the at least one elongated fiber arrangement is a woven fiber arrangement that is impregnated with a second polymeric material that forms a single phase material with the mass of the first polymeric material.

7. The device of claim 1, wherein the at least one fibrous insert includes a plurality of layers each including an elongated fiber arrangement, and each layer being anisotropic in its mechanical properties.

8. The device of claim 1, wherein the at least one fibrous insert includes a plurality of fibers including glass fibers, mineral fibers, carbon fibers, polymeric fibers, or any combination thereof.

9. The device of claim 1, wherein the mass of activatable material includes an epoxy-based material.

10. The device of claim 1, wherein an orientation of one or more fibers in the at least one elongated fiber arrangement is selected for providing localized rigidity in response to a predetermined load that is applied to the at least one elongated fiber arrangement.

11. The device of claim 1, wherein a resulting outer surface of the carrier is substantially free of knit lines or other imperfections that could provide a source of localized weakening of the carrier.

12. The device of claim 1, wherein the carrier has (i) a polymeric portion defined by the mass of the first polymeric material, (ii) a localized reinforcement portion defined by the at least one fibrous insert, and (iii) an interface portion between the polymeric portion and the localized reinforcement portion; wherein the polymeric portion, the interface portion, and the localized reinforcement portion are a generally smooth and/or continuous structure.

13. The device of claim 12, wherein the interface portion includes (i) an interpenetrating network defined by the first and second polymeric materials, (ii) chemical bonds between the first and second polymeric materials, or both (i) and (ii).

14. The device of claim 1, wherein the second polymeric material includes a liquid epoxy resin and monoethanolamine.

15. The device of claim 14, wherein a ratio of the liquid epoxy resin and monoethanolamine is about 1:1.

16. The device of claim 1, wherein the activated adhesive material is expandable to at least about 50% of its original volume.

17. The device of claim 1, wherein the opposing outer surfaces of the at least one fibrous insert are parallel to each other, and the opposing outer surfaces of the mass of the first polymeric material are parallel to each other.

* * * * *